Patented May 12, 1925.

1,537,483

UNITED STATES PATENT OFFICE.

FREDERICK J. MAYWALD, OF NUTLEY, NEW JERSEY.

RUBBER COMPOSITION.

No Drawing.    Application filed August 31, 1921. Serial No. 497,414.

*To all whom it may concern:*

Be it known that I, FREDERICK J. MAYWALD, a citizen of the United States, residing at Nutley, in the county of Essex and State of New Jersey, have invented certain new and useful Improvements in Rubber Compositions; and I do hereby declare the following to be a full, clear, and exact description of the invention, such as will enable others skilled in the art to which it appertains to make and use the same.

This invention relates to an improved composition for use in manufacturing rubber goods and articles of various kinds.

The principal objects of the invention are to provide a rubber composition which yields a finished product, when cured, possessing unusual tensile strength; a composition which produces better non-oxidizing qualities in both the uncured and cured stocks; and a composition which is cheaper than the heretofore known compounds suitable for the production of corresponding products.

A further object of the invention is to provide a composition which can successfully replace the use of compounds containing Pontianac, Jelutong, Accra Flake, and similar soft rubbers, while yet obtaining, among others, the advantages above mentioned.

Further objects and advantages of the invention will hereinafter appear.

Broadly my novel composition comprises the combination with any pure rubber gum compounds of an admixture of Sandee gum. Sandee gum is a natural product composed of the coagulated sap or latex of a tree of the genus Sapotacea, its species being unidentified botanically, but which is locally known where found as the Sandee tree; the latter is to be found in tropical zones, especially in Colombia and Equador, South America. The composition thus provided yields a product, when cured, having a much greater tensile strength and stretch than the same rubber compound without the Sandee gum content would provide. The presence of the Sandee gum in such a composition also acts as a softener for the rubber compound, and is, therefore, a very desirable addition to rubber compounds used for frictioning and skimming purposes, such as in the production of pneumatic tires, belting, hose and allied products.

The presence of the Sandee gum in the rubber compound promotes the successful working of the latter on tubing machines, and while in no way retarding the cure, yields a product which tubes very easily and freely, and finishes with a clean smooth surface.

The Sandee gum can with advantage be successfully employed as a substitute or in place of Pontianac, Jelutong, Accra Flake and similar soft rubbers in rubber compounds. The advantages offered by such use over said soft rubbers are that Sandee gum by itself ages well and does not become resinous on standing, as do Pontianac and similar rubbers. The Sandee gum does not have to be kept wet for purposes of preservation as do the soft rubbers of the kind above mentioned; and the same can be washed, dried and stored successfully with a minimum liability to deterioration. Furthermore, approximately one-half as much Sandee gum is required in a compound or composition designed to produce a given degree of softness and frictioning qualities as would be required if Jelutong or similar rubbers were used in such compound or composition, while at the same time an increase of tensile strength from twenty-five to fifty per cent over the corresponding Jelutong or similar compound is obtained.

The presence of Sandee gum in the composition produces in the unvulcanized compound and frictioning stocks a tendency against blooming.

The relative proportions of Sandee gum and pure rubber gum or rubber compound in a given composition are dependent upon the degree of softness or flexibility required of the product, and consequently the formulæ, as to such relative proportions, are necessarily subject to a very wide variation or range according to the specific results desired of the product to be made. I do not desire to claim specific proportions, since I believe myself to be the first discoverer of the advantage of combining with a pure rubber gum or rubber compound a proportion of Sandee gum, the same being an entirely new ingredient, and consequently conceive my invention to be, broadly, the resultant composition comprising an admixture of Sandee gum and pure rubber gum or rubber compound regardless of the exact relative proportions employed. In fact I claim:—

1. A vulcanizable composition comprising an admixture with a pure rubber gum compound, of Sandee gum.

2. A' composition for producing rubber products having a comparatively high degree of softness and flexibility comprising an admixture of pure rubber gum compound and Sandee gum.

In testimony that I claim the invention set forth above I have hereunto set my hand this 30th day of August, 1921.

FREDERICK J. MAYWALD.

Witnesses:
GEORGE D. RICHARDS,
EVA E. DESCH.